United States Patent [19]

Ryan

[11] E Re. 28,541

[45] Reissued Sept. 2, 1975

[54] DIAMINE-CURABLE POLYURETHANE COMPOSITIONS

[75] Inventor: William M. Ryan, Hacienda Heights, Calif.

[73] Assignee: The Dexter Corporation, Olean, N.Y.

[22] Filed: Oct. 15, 1973

[21] Appl. No.: 406,588

Related U.S. Patent Documents

Reissue of:

[64] Patent No.: 3,629,168
Issued: Dec. 21, 1971
Appl. No.: 818,801
Filed: Apr. 23, 1963

[52] U.S. Cl.... 260/18 TN; 260/22 TN; 260/31.2 N; 260/75 NB; 260/75 NH; 260/77.5 AB; 260/77.5 AM

[51] Int. Cl.[2] ..... C08G 18/16; C08G 18/32

[58] Field of Search ... 260/18 TN, 75 NB, 77.5 AB, 260/75 NH, 77.5 AM, 22 TN, 31.2 N

[56] References Cited

UNITED STATES PATENTS

| | | | |
|---|---|---|---|
| 2,955,056 | 10/1960 | Knox | 117/98 |
| 3,004,939 | 10/1961 | Varvaro | 260/22 |
| 3,188,302 | 6/1965 | Lorenz | 260/77.5 |
| 3,261,813 | 7/1966 | Ramos | 260/77.5 |
| 3,281,378 | 10/1966 | Garber et al. | 260/2.5 |
| 3,401,133 | 9/1968 | Grace et al. | 260/29.2 |
| 3,402,135 | 9/1968 | Schwartz et al. | 260/75 NB |
| 3,428,610 | 2/1969 | Klebert | 260/75 |
| 3,429,856 | 2/1969 | Hoeschele | 260/77.5 |
| 3,463,748 | 8/1969 | Scheibelhoffer | 260/18 |
| 3,471,445 | 10/1969 | Carr | 260/75 NH |
| 3,478,089 | 11/1969 | Ogurana et al. | 260/501.2 |

OTHER PUBLICATIONS

Saunders et al.–Polyurethanes–Part I. Interscience, New York (1962) pp. 129–134, 173–179.

*Primary Examiner*—H. S. Cockeram
*Attorney, Agent, or Firm*—Harris, Kern, Wallen & Tinsley

[57] ABSTRACT

Diamine cured polyurethane compositions having unusually long pot life while rapidly curing at elevated temperatures and having remarkable storage stability at −40° F. are prepared by combining a prepolymer of a di or poly isocyanate and a hydroxy terminated polyether or polyester having a molecular weight in the 150 to 3,000 range, said prepolymer containing about 2.5 to 10% by weight —NCO, with a lower alkylene bis anthranilic acid ester or a suspension of a lower alkylene bis anthranilic acid ester in an anhydrous diluent selected from the group consisting of plasticizers and co-curing glycols, the proportions of said prepolymer and hardener being such as to provide an $NH_2$:NCO ratio of about 0.9:1 to 1.0:1, and oleic acid as a polyurethane catalyst. The prepolymer and hardener, if degassed to remove air and moisture, provide stable two-component resin systems having excellent shelf life. One component systems with exceptional storage stability are prepared by mixing the prepolymer and hardener, freezing the mixture at −40°F. and storing the resulting composition at −40° F.

12 Claims, No Drawings

DIAMINE-CURABLE POLYURETHANE COMPOSITIONS

Matter enclosed in heavy brackets [ ] appears in the original patent but forms no part of this reissue specification; matter printed in italics indicates the additions made by reissue.

BACKGROUND OF THE INVENTION

In the preparation of strong, tough urethane elastomers the best and most widely used amine type hardener heretofore employed has been 4,4′-methylene bis-ortho chloroaniline which is readily available under the trademark MOCA. A limitation on its use, however, has been its speed of reaction with most isocyanate prepolymers. Being a solid, it must be heated or dissolved in a solvent or very finely ground, and suitably dispersed in a carrier, to be conveniently distributed throughout the prepolymer. Thorough mixing in the prepolymer is essential to give a strong, thoroughly cured elastomer, yet the reaction time when using MOCA is so rapid that proper mixing is frequently difficult, and the pot life is too short for any but small and simple castings without elaborate and expensive proportionating and mixing equipment.

In U.S. Pat. No. 3,188,302 the preparation of polyurethane products using MOCA as hardener is disclosed and claimed (claim 5). In this patent it is significant to note that in Example I this rapid reactivity of MOCA is recognized in the statement "casting quickly into molds." Furthermore, the statement at column 7, lines 20 to 25 concerning the "similar results obtained" on substitution of other amine hardeners for the MOCA is a clear indication that the patentee considered this rapid reactivity to be characteristic of all the recited amine hardeners.

A further limitation on the MOCA systems, regardless of their pot life, has been their instability towards storage at reduced temperatures as one component, premixed or "frozen" urethane. The MOCA systems are so reactive that even as low as −40° F. they cannot be stored for much longer than two weeks without severe increases in viscosity and subsequent loss of pot life.

THE INVENTION

It has now been discovered that it is possible to provide polyurethane systems having cured properties and characteristics similar to those obtained with MOCA as hardener, but having a pot life or workable time 5 to 25 times longer than possible with MOCA. Pot life is taken as the time required to reach 100,000 cps. [Mixed vis-] *mixed vis*-cosity for the 2 component systems and as the time required to reach 200,000 cps. viscosity for the one component or frozen systems. Further, it is possible to provide systems which not only have longer pot life but which cure faster at room or elevated temperatures and which are 3 to 20 times more stable towards storage at −40° F. than the conventional MOCA cured urethanes by employing as hardener a lower alkylene-bis-anthranilic acid ester, also known as a lower alkylene-bis-(2-carboxyalkylaniline) of which methylene bis methyl anthranilate (MMA) is the most readily available and preferred. It is significant to note that this compound is actually referred to at column 7, line 23 of U.S. Pat. No. 3,188,302, as providing results similar to those obtained with MOCA. This is so at variance with the discovery of the present invention that the statement should be disregarded as a meaningful disclosure.

In the new compositions of the present invention, a prepolymer of a di or poly isocyanate and a hydroxyterminated polyether or polyester having a molecular weight in the 150 to 3,000 range, said prepolymer containing about 2.5 to 10% by weight −NCO, is combined with a lower alkylene bis anthranilic acid ester or a suspension of a lower alkylene bis anthranilic acid ester in an anhydrous diluent selected from the group consisting of plasticizers and co-curing glycols, the proportions of said prepolymer and hardener being such as to provide a $NH_2$:NCO ratio of about 0.9:1 to 1.0:1.

The isocyanates which can be employed are represented generally by the formula $R(NCO)_x$ where R is selected from the class consisting of di- and poly functional alkylene, arylene and aryl-alkylene groups containing 6 to 14 carbon atoms and X is 2 to 4. Numerous isocyanates answering this description are available and can be used in the composition with the selection of particular isocyanate depending in part on the physical properties desired in the cured composition. For good general purpose elastomers, the most widely used diisocyanate is toluene diisocyanate, particularly toluene 2,4-diisocyanate and commercial grade materials containing about 65 to 80% 2,4 and 35 to 20% 2,6 isomers. When harder and tougher elastomers are desired, and a somewhat higher cost is not objectionable, it is customary to use 4,4′-methylene bis-(phenyl isocyanate) and commercial grades thereof which may include poly phenyl methylene polyisocyanates in which three or more phenyl isocyanate groups are combined by methylene groups. When products are desired which are resistant to color change upon outdoor exposure, it is preferable to employ lysine diisocyanate which is the methyl ester of hexanoic acid 2,6-diisocyanate or other aliphatic diisocyanate.

Typical hydroxyterminated polyethers and polyesters for use in the preopolymers include polypropylene glycols, polytetramethylene glycols, and polyesters which are reaction products of short glycols such as diethylene glycol with dibasic acids.

Prepolymers of the type above described and the variations therein to achieve different properties in cured compositions are well-known to the polyurethane art, and the novelty of the present invention resides not in the prepolymer, but rather in the particular type of diamine curing agent which so markedly prolongs the pot life or work time while permitting rapid curing at elevated temperatures, as well as giving long premix storage life at low temperature, and providing properties in the cured product generally comparable to those obtained with other diamine curing agents.

The superior diamine curing agents of the present invention may be described as lower alkylene bis anthranilic acid esters in which the alkylene group and the ester groups may contain 1 to 3 carbon atoms. Most readily available, and hence preferred, of these anthranilic acid esters is methylene bis methyl anthranilate (MMA).

The anthranilic acid esters are solids which in a finely divided form are uniformly distributed throughout the prepolymer or the anthranilic acid esters are dispersed in a liquid diluent which has the property of acting as a plasticizer or a co-curing component for the polyurethane systems. Glycols, for example, can be employed as well as phthalic acid esters such as dioctyl phthalate. Such dispersions can suitably contain as much as 65% by weight of the anthranilic acid ester and suitably contain a small amount of pigment such as carbon black, titanium dioxide or the like, both to provide the desired color in the end product and to provide a colorimetric indicator of the uniformity of blending of anthranilic acid ester with the prepolymer.

The anthranilic acid ester and prepolymer are preferably employed in proportions to provide an $NH_2$:NCO ratio of about 0.9:1 to 1.0:1.

The anthranilic acid ester or suspension is blended with the prepolymer at room temperature or about 25°C. At this temperature the blend will have a pot life of the order of 3 hours to 11 hours or longer depending upon the reactivity; i.e., the NCO content of the prepolymer. In some instances, where the prepolymer may be too viscous to permit mixing at room temperature, the temperature can be elevated slightly to reduce the viscosity. Any such elevation of temperature, however, should be maintained at a minimum as this will tend to shorten the pot life or useful working time of the blend.

It is also possible in the new systems to employ amounts on the order of 1 to 3% based on the weight of the anthranilic acid ester or suspension of a polyurethane catalyst such as oleic acid. [This has little effect on the pot life, but substantially reduces the cure time at both room temperature and elevated temperatures.] *The polyurethane catalyst reduces the long pot life and cure time attained by the use of the diamine hardeners of the present invention, at both room temperature and elevated temperature.*

In making the new systems, the prepolymer and the anthranilic acid ester suspensions, with or without catalyst, are preferably degassed to remove entrapped air and moisture and packaged in separate containers. Thus packaged, they exhibit very good shelf or storage stability with little change in the pot life and cure characteristics even after many months of storage. Alternatively the anthranilic acid ester may be dispersed directly into the prepolymer and the resulting composition frozen and stored at −40° F.

The following examples show the preparation of typical compositions in accordance with the present invention in comparison with similar compositions containing 4,4′-methylene bis-ortho chloroaniline (MOCA) as the diamine curing agent. It is to be understood, however, that these examples are given by way of illustration and not of limitation.

EXAMPLE I

Dried methylene bis methyl anthranilate (MMA) and methylene bis-ortho chloroaniline (MOCA) were powdered to pass a 200 mesh screen. The two powdered hardeners were mixed at 25° C. with prepolymers of 1,4 polybutylene glycol and toluene diisocyanate having —NCO concentrations indicated in the following tabulation in proportions to provide an $NH_2$:NCO ratio of 0.9 to 1.0. Approximately 150 gram quantities of the resulting mixtures were observed for pot life at 25°C. and 100°C. with the following results:

Pot Life at 25° C.

| | MMA | MOCA |
|---|---|---|
| Polymer A 4.12% NCO | 10.5 hrs. | 2 hrs. |
| Polymer B 9.45% NCO | 3.5–4 hrs. | 23 min. |
| | Pot life at 100° C. | |
| Polymer A | 11.5 min. | 18.2 min. |

Polymer B is too reactive to use at 100° C. with either hardener. Note that the new hardener, although very slow at 25° C., is more rapid than MOCA at 100° C.

EXAMPLE II

Methylene bis methyl anthranilate, MMA, was dried at 212° F. for two hours, and powdered to pass a 200 mesh screen. One hundred parts by weight of this material was mixed with one part of carbon black and 85 parts of dioctyl phthalate. This mixture was then passed through a three roll mill set for a fine grind. The resulting dispersion was a black thixotropic paste with a Hegman fineness of grind of 3. It was degassed to remove air and contained 53.76% by weight MMA.

A similar dispersion was prepared using methylene bis ortho chloroaniline, MOCA, providing a paste very much like that made with the MMA using 100 parts of MOCA, 1 part of carbon black and 66.7 parts of dioctyl phthalate.

1,4 polybutylene glycol, toluene diisocyanate prepolymers similar to those used in Example I but containing slightly different —NCO content as indicated in the tabulation were mixed with the dispersions in proportions providing an $NH_2$:NCO ratio of 0.95 to 1.0. To additional quantities of the prepolymer-MMA hardener mixtures were added approximately 2% by weight of technical grade oleic acid as catalyst. The pot life for these mixtures at 25° C, is tabulated below.

| | Pot life at 25° C. | | |
|---|---|---|---|
| | MMA, hrs. | MMA plus oleic, hrs. | MOCA, min. |
| Polymer C 7.7% NCO | 4–5 | 2 | 25 |
| Polymer D 9.08% | 4.5 | 2 | 20 |

The room temperature curing rates of the three samples from polymer C were followed by noting the changes in hardness:

| | Shore D Values | | |
|---|---|---|---|
| | MMA | MMA plus oleic | MOCA |
| 1 day | 7 | 33 | 38 |
| 4 days | 37 | 50 | 47 |
| 5 days | 43 | 50 | 47 |
| 6 days | 47 | 50 | 47 |
| 7 days | 47 | 50 | 47 |

The catalyzed MMA system cures about as quickly as does the MOCA system, but yet shows a much longer working life. This is perhaps better illustrated by the viscosity build-up. Brookfield RVF viscosity, Spindle 7/20 r.p.m. 150 g. mass at 250° C.:

POLYMER C VISCOSITY

| Curing agent | MMA plus catalyst, cps. | MOCA, cps. |
|---|---|---|
| 10 minutes | 11,000 | 13,400 |
| 15 minutes | 11,000 | 15,000 |
| 30 minutes | 13,600 | 31,000 |
| 43 minutes | — | 90,000 |
| 45 minutes | 17,000 | — |
| 60 minutes | 22,000 | — |

A comparison of the physical properties of resin systems cured 16 days at room temperature with the MMA hardener plus catalyst and with the MOCA hardener are tabulated below:

| | MMA plus catalyst | MOCA |
|---|---|---|
| Polymer C: | | |
| Tensile strength, p.s.i | 3,272 | 3,250 |
| Elogation, percent | 456 | 300 |
| Tear, die C, p.l.i | 549 | 550 |
| Tear, ASTM D470,p.l.i | 145 | 140 |
| Shore D Hardness | 54/50 | 54/47 |
| Polymer D: | | |
| Tensile strength, p.s.i | 4,806 | 5,000 |
| Elongation, percent | 252 | 300 |
| Die C tear p.l.i | 641 | 600 |
| Tear, ASTM D470, p.l.i | 140 | 125 |
| Shore D Hardness | 60/53 | 60/55 |

EXAMPLE III

A 1,4 polybutylene glycol, toluene, diisocyanate prepolymer similar to those used in Examples I and II but having an excess NCO of 6.3% was intimately mixed at 25° C. with: (1) MMA powdered to pass a 200 mesh screen, (2) MMA powder plus 2% by weight, on the prepolymer-hardener blend, of technical grade oleic acid, (3) MOCA powdered to pass a 200 mesh screen; such that the $NH_2$/NCO ratio was 0.9/1 to 1.0/1. Each mixture was de-aired briefly to remove entrapped air and then poured into several tubular polyethylene containers. The temperature of each container was rapidly lowered to −40° F. by immersion in a Dry Ice-methanol bath and the containers were stored at −40° F. The containers were then periodically removed from storage and rapidly warmed until an average temperature of 25° C. was reached. The pot lives (time required to reach 200,000 cps.) were recorded as a function of storage time. The MOCA mixture lost 5 minutes of pot life for every 3 days of storage time, the MMA mixture did not lose any pot life on storage for over 90 days, and the MMA mixture plus 2% oleic acid lost 5 minutes of pot life for every 9 days of storage. Not only were the storage stabilities of the MMA and MMA+oleic acid mixture much greater than the MOCA mixture but their pot lives at 25° C. were greater. The initial pot life for the MMA mixture was 3½ hours, and MMA+oleic acid mixture had a 50 minute pot life while the MOCA blend had only 15 minutes.

The room temperature cure times of the mixtures were measured by recording the increase in Shore D hardness after 10 seconds indentation over a period of days. The results are tabulated below:

Shore D Values

| | MMA | MMA plus oleic | MOCA |
|---|---|---|---|
| 1 day | | 15 | 10 |
| 2 days | 10 | 32 | 25 |
| 3 days | 17 | 40 | 30 |
| 4 days | 25 | 43 | 35 |
| 5 days | 35 | 43 | 37 |
| 6 days | 43 | 43 | 43 |

It should be noted that the MMA+oleic even at room temperature cures about 2 times as fast, has about 3 times the room temperature pot life and the rate of viscosity drift versus storage at −40° F. is 3 times better than the MOCA system.

EXAMPLE IV

A polypropylene glycol prepolymer is prepared by rapidly adding 25 parts of toluene diisocyanate (80/20 mixture of the 2,4 and 2,6 isomers) to an agitated sample of 75 parts of a polypropylene glycol of 1,500 molecular weight. The mix was warmed to 60°, under nitrogen, and held at that temperature for an hour. Then heat was removed, batch sealed up and allowed to stand overnight. This gave a prepolymer of 6.15% NCO.

It was cured with dispersions of MOCA and MMA in dioctyl phthalate prepared as describd in Example II. The MMA dispersion was modified by the addition of 2% oleic acid, which speeds its action. Hardeners were in proportion to provide an $NH_2$:NCO ratio of 0.9 to 1.0.

At 25° C., the mixture containing MMA hardener and catalyst had a pot life of four hours, whereas the mixture containing MOCA hardener had a pot life of only 45 minutes.

After cure for 16 hours at 150° F. plus 24 hours at room temperature (25° C.), the products showed the following physical properties.

Physical Properties

| | MMA plus catalyst | MOCA |
|---|---|---|
| Shore D | 43/40 | 41/39 |
| Tensile strength, p.s.i. | 1,650 | 1,000 |
| Elongation, percent | 160 | 127 |
| Tear die C, p.l.i. | 190 | 160 |

EXAMPLE V

A polyester was prepared by combining three mols of adipic acid and four mols of diethylene glycol. 0.1% stannous octoate was used as catalyst and 5% toluene was added to assist in the water removal. After 6 hours of gentle reflux the acid number was less than one. The remaining toluene was taken off. The hot polyester (115° C.) was very fluid. It was cooled to 50° C. at which temperature it remained fluid. 2.2 mols of technical p,p′ diphenyl methane diisocyanate was melted and added at 50° C. to the hot prepolymer. There was a noticeable exotherm but by the use a cold water bath the temperature was held at 80° C. Reaction subsided within a half hour and temperature started to fall. External heat was then applied and 80° temperature maintained for another hour. Cooled to room temperature, product a waxy solid, NCO content 6.7%.

One hundred grams of the prepolymer was heated to 60° C. to make it reasonably fluid and 55.4 grams of an MMA dispersion in dioctyl phthalate prepared as described in Example II, was mixed in well. Pot life at this temperature was about 20 minutes, sufficient to permit de-airing and casting of a 12 inches × 12 inches × ⅛ inch sheet mold. The cast material gelled in 1 minutes at 125° C.

When fully cured, the cast elastomer showed the following physical properties:

Tensile strength—3,350 p.s.i.
Elongation—328%
ASTM D624 Die C Tear—475 p.l.i.
ASTM D470 Tear—116 p.l.i.
Hardness, Shore D—45–40

The same prepolymer at 60° C. was mixed with a MOCA dispersion in dioctyl phthalate (34.6 grams). The mixture exothermed somewhat, and gelled in less than a minute at the temperature reached, which was approximately 75° C. This reaction was too fast to permit thorough mixing or de-airing and no casting could be made.

The foregoing examples demonstrate that the new MMA hardener provides a pot life or working time at least five times longer and sometimes as much as 25 times longer than the pot life when using MOCA hardener at room temperature. They also demonstrate that the increased pot life was not gained at the expense of cure time and indeed that systems can be developed with MMA which will cure, even at room temperature, faster than the existing MOCA system and that these materials are from 3–20 times more stable towards premix storage at −40° F. than the existing MOCA systems.

Various changes and modifications in the polyurethane compositions herein described and providing the unusually long pot life or working time may occur to those skilled in the art, and to the extent that such changes and modifications are embraced by the appended claims, it is to be understood that they constitue part of the present invention.

I claim:

1. A heat curable polyurethane composition consisting essentially of a prepolymer of an organic diisocyanate and a hydroxy terminated polyether or polyester having a molecular weight of from about 150 to 30,000, said prepolymer containing from about 2.5 to 10% by weight —NCO; a diamine hardener for said polyurethane composition selected from the group consisting of lower alkylene bis anthranilic acid esters and suspensions containing up to about 65% by weight thereof in an anhydrous diluent selected from the group consisting of plasticizers and co-curing glycols, said prepolymer and hardener being present in an amount to provide a ratio of $NH_2$:NCO of from about 0.9:1 to 1:1; and from about 1 to 3% by weight of oleic acid as a polyurethane catalyst, said polyurethane composition being characterized in that it exhibits prolonged, improved pot life at room temperature [of at least about 3 hours] , *which is at least five times longer than the pot life of identical polyurethane compositions using 4,4'-methylene bis-ortho chloroaniline as a hardener compared to lower alkylene bis anthranilic acid ester hardeners.*

2. A polyurethane composition as defined in claim 1 wherein said prepolymer is formed from toluene diisocyanate.

3. A polyurethane composition as defined in claim 1 wherein said prepolymer is formed from commercial grade toluene diisocyanate comprising at least 65% of the 2,4 isomer.

4. A polyurethane composition as defined in claim 1 wherein the prepolymer is formed from 4,4'-methylene bis-(phenyl isocyanate).

5. A polyurethane composition as defined in claim 1 wherein the prepolymer is formed from the methyl ester of 2,6-diisocyanato-caproic acid.

6. A polyurethane composition as defined in claim 1 wherein said prepolymer is formed from polypropylene glycol.

7. A polyurethane composition as defined in claim 1 wherein said prepolymer is formed from a polybutylene glycol.

8. A polyurethane composition as defined in claim 1 wherein said prepolymer is formed from a hydroxyterminated glycol dicarboxylic acid ester.

*9. A heat curable polyurethane composition consisting essentially of polyurethane prepolymers containing from about 2.5 to 10% by weight NCO, and a diamine hardener for said polyurethane composition consisting of a lower alkylene bis anthranilic acid ester, said prepolymer and hardener being present in an amount to provide a ratio of $NH_2$:NCO of from about 0.9:1 to 1.1; and from about 1 to about 3% by weight of a polyurethane catalyst, said polyurethane composition being characterized in that it exhibits prolonged, improved pot life, which is at least five times longer than the pot life of identical polyurethane compositions using 4,4'-methylene bis-ortho chloroaniline as a hardener compared to lower alkylene bis anthranilic acid ester hardeners.*

*10. A heat curable polyurethane composition as set forth in claim 9 wherein said polyurethane catalyst is oleic acid.*

*11. A heat curable polyurethane composition as set forth in claim 9 wherein said polyurethane catalyst is stannous octoate.*

*12. A heat curable polyurethane composition as set forth in claim 9 wherein said hardener is methylene bis methyl anthranilate.*

* * * * *